Dec. 2, 1952  H. H. HOKE, JR  2,619,930
AIRCRAFT CARRIER MULTIPLE PROPELLER ATTACHMENT
Filed July 25, 1950  2 SHEETS—SHEET 1
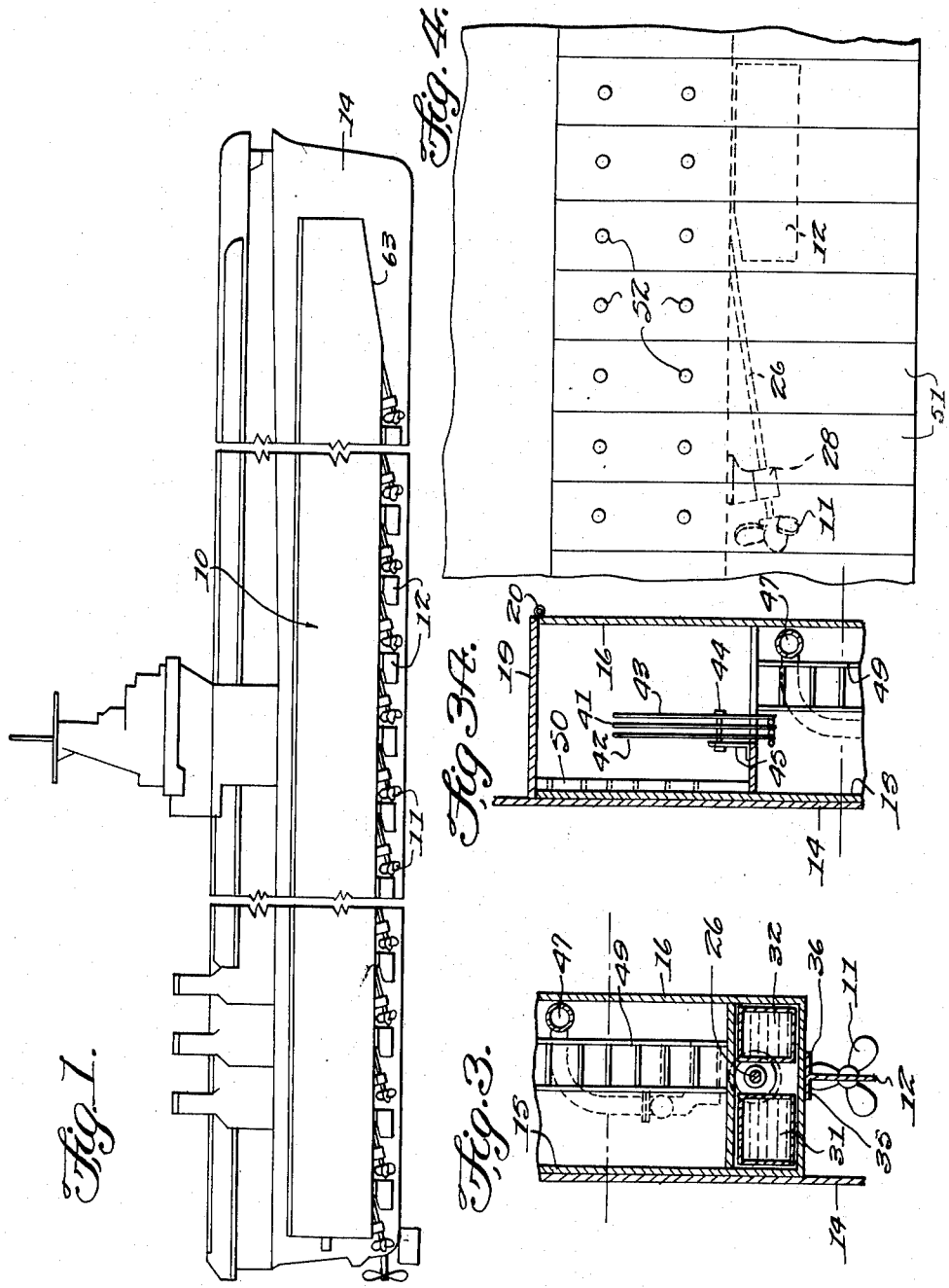
INVENTOR.
Harry H. Hoke, Jr.,
BY Victor J. Evans & Co.
ATTORNEYS

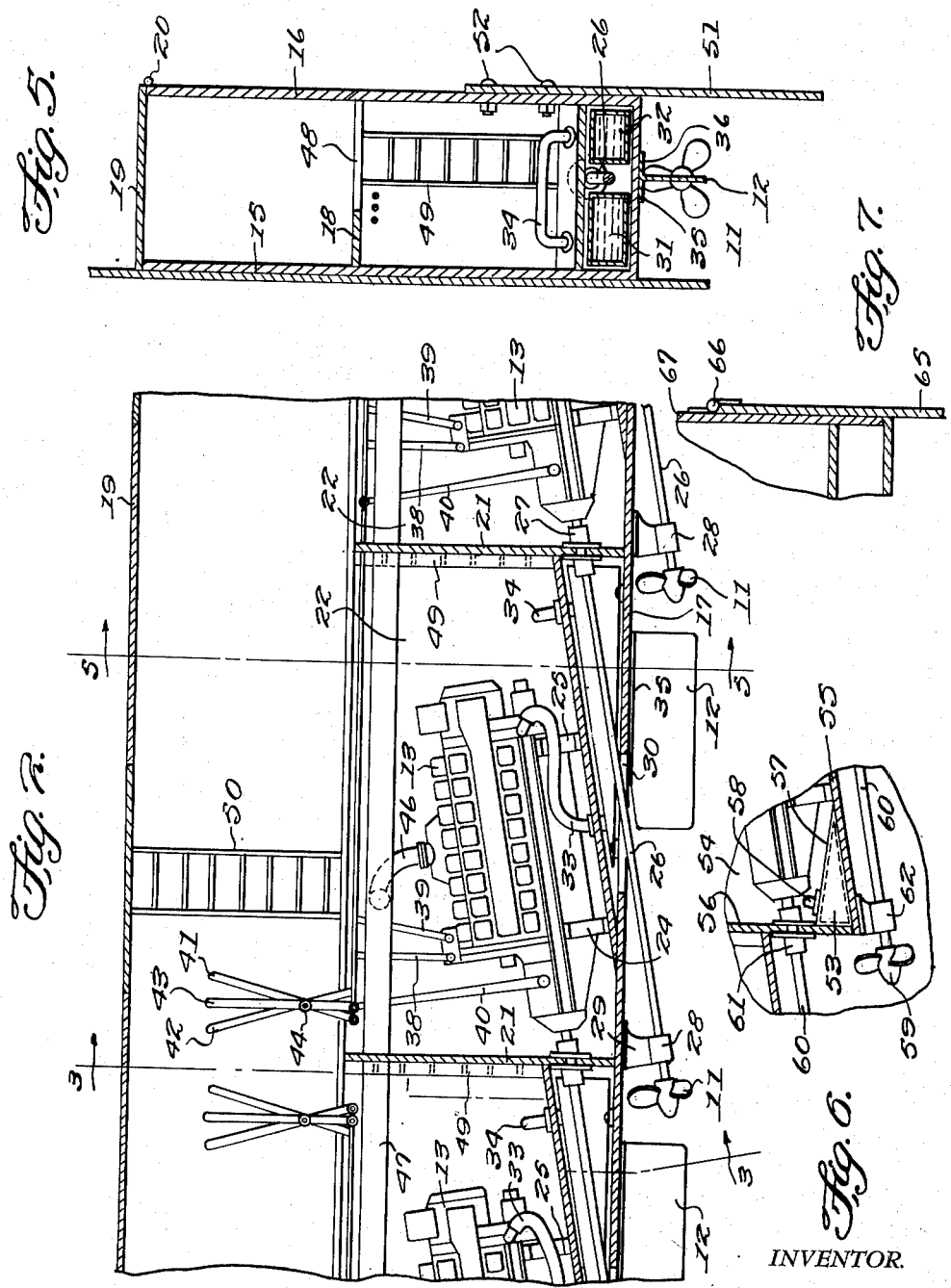

Patented Dec. 2, 1952

2,619,930

UNITED STATES PATENT OFFICE 2,619,930

AIRCRAFT CARRIER MULTIPLE PROPELLER ATTACHMENT

Harry H. Hoke, Jr., Washington, D. C.

Application July 25, 1950, Serial No. 175,815

1 Claim. (Cl. 115—38)

This invention relates to auxiliary propeller attachments for marine vessels and particularly war ships, and in particular comparatively thin elongated casings mounted along the sides of a ship and having a plurality of spaced propellers extended downwardly from straight lower surfaces of the casings and with longitudinally disposed baffles providing water straighteners positioned between the propellers and aligned therewith.

The purpose of this invention is to provide an improved construction for auxiliary propeller housings of war ships and the like wherein the propellers are mounted to operate with the highest possible efficiency.

The auxiliary propeller attachment of this invention is an improvement over the high speed propeller train ship attachment of my co-pending application filed June 9, 1950, with the Serial Number 167,059 in that the saw toothed base of the casing is replaced with a casing having a flat bottom and it is believed that with this construction greater efficiency will be obtained from the propellers.

With this thought in mind this invention contemplates an improved mounting for auxiliary propellers where a battery of propellers is provided on each side of a ship and where each propeller is mounted on an individual shaft and driven by an individual motor.

The object of this invention is, therefore, to provide an improved mounting for batteries of auxiliary propellers where lines of propellers with each having an individual motor are attached to the sides of a vessel whereby one propeller is positioned ahead of another.

Another object of the invention is to provide means for removing turbulence in water between propellers where lines of propellers are used in spaced relation with succeeding propellers following the leading propeller.

Another object of the invention is to provide means whereby fresh cooling water is provided for cooling internal combustion engines where engines are used in continuous lines and with each engine driving a propeller.

A further object of the invention is to provide an improved mounting for continuous batteries of auxiliary propellers provided on the sides of marine vessels in which the mounting is of a comparatively simple and economical construction.

Other features and advantages of the invention will appear from the following description taken in connection with the drawings wherein:

Figure 1 is a side elevational view showing an aircraft carrier with an auxiliary propeller mounting housing positioned on the side thereof and with parts broken away.

Figure 2 is a longitudinal section through a section of the housing taken at a point substantially midway of the length of the housing, with the vessel omitted and with the parts shown on an enlarged scale.

Figure 3 is a detail showing a section through the lower part of the housing and taken on line 3—3 of Figure 2.

Figure 3a is a similar view showing the upper part of the housing.

Figure 4 is a fragmentary side elevational view illustrating a modification wherein torpedo proof plates provide a cover for the lower part of the housing and propellers extended therefrom.

Figure 5 is a cross section through the housing taken on line 5—5 of Figure 2 showing the position of the plates shown in Figure 4.

Figure 6 is a detail illustrating a further modification and showing a method of incorporating water tanks in sections of a housing wherein the sections are provided with sloping bottoms.

Figure 7 is a detail showing a further modification wherein the torpedo resisting plates are hinged to the sides of the housing.

Referring now to the drawings wherein like reference characters denote corresponding parts the improved auxiliary propeller mounting of this invention includes a housing 10 with propellers 11 extended from the lower part thereof, with baffle plates 12 providing straighteners positioned between the propellers, with the propellers driven by engines 13 and with the housing mounted on the side of a ship 14.

The housing 10 is formed with an inner wall 15, an outer wall 16, a bottom 17, an intermediate horizontally disposed partition 18, and a cover formed with sections 19 hinged to the upper edge of the outer wall 16 by hinges 20. The lower part of the housing between the horizontally disposed partition 18 and the bottom 17 is provided with spaced transverse partitions 21 dividing the lower part of the housing into compartments 22 in which the engines 13 are positioned and the lower portions of the compartments 22 are provided with inclined floors 23, upon which the engines 13 are mounted through stands 24 and 25.

With the engines 13 positioned, as illustrated in Figure 2, the shaft 26 of each engine extends through a bearing 27 in the partition forming the trailing end of the compartment. The outer end of the shaft is journaled in a bearing 28 of a bracket 29 mounted on the under surface of the bottom 17 and the propeller 11 is mounted on the outer end of the shaft. With the parts arranged in this manner the shaft of one engine extends below the following engine and the propeller is positioned below the leading end of the second compartment behind the compartment in which the engine, by which the propeller is driven, is positioned. The shaft 26 extends through an opening 30 in the bottom 17 and the open area within the compartment between the floor 23 and the bottom 17 is filled with sea water through the opening 30. This opening which is triangular shaped in section is provided with fresh water tanks 31 and 32 which contains cooling water of the engines and the water in the tanks is cooled by the sea water flowing into the open space around the tanks.

The fresh water tanks 31 and 32 are connected to the cooling water jacket of the engines by double tubes 33 and, as illustrated in Figure 5 the tanks may be connected by cross connections 34. By this means one tank only may be used to provide cooling water for an engine and by changing the connections either of the tanks may be used, or as illustrated in Figure 5 tanks may be connected together so that both tanks may be used.

The longitudinally disposed baffle plates 12, which are attached, preferably by welding to the lower surface of the bottom 17 through flanges 35 and 36 are positioned in a plane extended through the axis of the propeller shaft, so that they follow each propeller and, as illustrated in Figure 2 the trailing ends of the baffles are formed with sloping upper surfaces 37 to provide clearing for the propeller shaft.

As illustrated in Figure 2 each engine 13 is provided with a starting lever 38, a throttle lever 39 and a control lever 40, and these levers are connected to hand levers 41, 42 and 43, respectively. The hand levers are pivotally mounted on pins 44 in bearing stands 45.

The engines 13 are provided with exhaust connections 46 that extend to an exhaust header 47 and the exhaust header extends to the trailing end of the housing or may open at suitable points throughout the length thereof.

The intermediate horizontally disposed partition 18 is provided with openings 48 and ladders 49, positioned against the transverse partitions 21, extend downwardly in the compartments. A ladder, or a series of ladders as indicated by the numeral 50 may be provided in the upper section of the housing whereby operators may travel from the deck of the ship to the interior of the auxiliary propeller housing as may be desired.

As illustrated in Figures 4 and 5 the lower part of the housing may be protected by plates 51 that may be positioned vertically as shown, or in any other suitable position and when the ship is anticipating traveling into a battle zone these plates are applied, by bolting the plates to the outer surface of the outer wall 16 by bolts 52, as shown, however, the plates may also be attached by hinges, welding or by other suitable means.

In the modification illustrated in Figure 6 water tanks 53 are provided in lower corners of compartments 54, the compartments being provided with sloping bottoms 55 and separated by transverse partitions 56. The tanks 53 are formed with cover plates 57 and connections 58 extend from the tanks to the cooling water jackets of the engines, similar to the connections 33 shown in Figure 2. In this design the propellers 59 are carried by the outer ends of shafts 60, the shafts being journaled in inner bearings 61 and outer bearings 62.

With the auxiliary propeller housing formed as illustrated in Figures 1 and 2, a housing is attached to each side of a ship and when it is desired to make a quick-get-away the entire battery of engines on each side of the ship is started whereby all of the propellers are operated and the speed of the ship is increased accordingly.

For normal use it may only be advisable to use the last propeller of each battery or as many propellers as may be desired.

The shape of the housings may be designed to correspond with the vessel upon which it is to be used and, as illustrated in Figure 1 the forward ends of the housings may be provided with sloping lower surfaces as indicated by the numeral 63.

In addition to providing means for increasing the speed of a ship the continuous line of engines on the sides of the ship provides protection against torpedoes and the like and, with this thought in mind the outer wall 16 of the housings may be formed to repel torpedos, shells, and the like.

In the design shown in Figure 7 the torpedo resisting plates are hinged to the housing so that they may be folded upwardly when not in use. In this design plates 65 similar to the plates 51 are attached by hinges 66 to a housing 67 similar to the housing 10 whereby the plates may be folded upwardly against the side of the housing or vessel when not in use.

It will be understood that other modifications may be made in the design and arrangement of the parts without departing from the spirit of the invention.

What is claimed is:

In combination with the hull of a vessel, lateral casings attached one on each side of the hull and extending longitudinally thereof, said casings being interiorally divided into a series of compartments running longitudinally of the casing, prime movers mounted one in each compartment, and propellers driven by said prime movers and extending below the bottoms of said casings, the axes of the propellers being at an angle to the bottom walls of the casings, and baffles consisting of pendent plates positioned between succeeding propellers and lying in the plane of the axes of said propellers.

HARRY H. HOKE, Jr.

REFERENCES CITED

The following references are of record in the file of this patent:

UNITED STATES PATENTS

| Number | Name | Date |
| --- | --- | --- |
| 624,353 | Lighthall | May 2, 1899 |
| 1,944,242 | Johnson | Jan. 23, 1934 |
| 2,005,473 | Sandin | June 18, 1935 |
| 2,374,467 | Sykes | Apr. 24, 1945 |
| 2,387,700 | Cribb | Oct. 23, 1945 |
| 2,474,855 | Mimopoulos | July 5, 1949 |

FOREIGN PATENTS

| Number | Country | Date |
| --- | --- | --- |
| 13,030 | Great Britain | Sept. 11, 1915 |
| 14,034 | Great Britain | Nov. 1, 1886 |
| 586,640 | Great Britain | Mar. 26, 1947 |